United States Patent [19]

Simpson

[11] Patent Number: 4,822,657

[45] Date of Patent: Apr. 18, 1989

[54] BULLET RESISTANT PANEL

[75] Inventor: Terry W. Simpson, Tulsa, Okla.

[73] Assignee: Alliance Wall Corporation, Norcross, Ga.

[21] Appl. No.: 1,383

[22] Filed: Jan. 8, 1987

[51] Int. Cl.$^4$ .............................................. B32B 15/14
[52] U.S. Cl. ............................. 428/69; 89/36.02; 109/80; 109/82; 109/84; 428/71; 428/74; 428/192; 428/246; 428/285; 428/308.4; 428/464
[58] Field of Search .................. 428/911, 308.4, 304.4, 428/285, 246, 225, 537.1, 464, 457, 192, 71, 74, 69; 89/326.02; 109/80, 82, 84

[56] References Cited

U.S. PATENT DOCUMENTS

| | | | |
|---|---|---|---|
| 3,563,836 | 2/1971 | Dunbar | 109/80 |
| 3,577,306 | 5/1971 | Baker et al. | 109/80 |
| 3,592,942 | 7/1971 | Hauck et al. | 161/44 |
| 3,916,060 | 10/1975 | Fish et al. | 428/303 |
| 3,958,276 | 5/1976 | Clausen | 2/2 |
| 3,962,976 | 6/1976 | Kelsey | 109/82 |
| 4,029,838 | 6/1977 | Chamis et al. | 428/911 |
| 4,057,359 | 11/1977 | Grooman | 428/911 |
| 4,186,648 | 2/1980 | Clausen et al. | 109/80 |
| 4,198,454 | 4/1980 | Norton | 428/911 |
| 4,241,457 | 12/1980 | Klein et al. | 428/911 |
| 4,259,028 | 3/1981 | Cook | 428/71 |
| 4,292,882 | 10/1981 | Clausen | 109/80 |
| 4,316,404 | 2/1982 | Medlin | 428/911 |
| 4,323,000 | 4/1982 | Dennis et al. | 428/911 |
| 4,404,889 | 9/1983 | Miguel | 428/911 |
| 4,442,780 | 4/1984 | Child | 109/80 |
| 4,455,801 | 6/1984 | Merritt | 109/84 |
| 4,501,856 | 2/1985 | Harpell et al. | 428/911 |
| 4,510,200 | 4/1985 | Samowich | 428/911 |

OTHER PUBLICATIONS

"Ballistic Liners Improve Mil3 Survivability Rate": Army Research, Development & Acquisition Magazine, Jul.–Aug. 1980, p. 7.

"Chemical and Plastic Materials Section, A.D.P.A.": National Defense, vol. LXVI, No 378, May–Jun 1982, pp. 20 and 21.

Kevlar, Aramid Brochure 12pp.

Primary Examiner—Paul J. Thibodeau
Attorney, Agent, or Firm—Bacon & Thomas

[57] ABSTRACT

A bullet resistant panel defined by an assembly including plural layers of impact resistant fabric and a layer of insulating foam, the assembly being secured within a peripheral frame and laminated between intermediate substrates of cellulosic material and exterior layers of metal. The panel may be used in constructing protective walls or barriers subjected to possible impact by bullets or other high impact force projectiles.

3 Claims, 2 Drawing Sheets

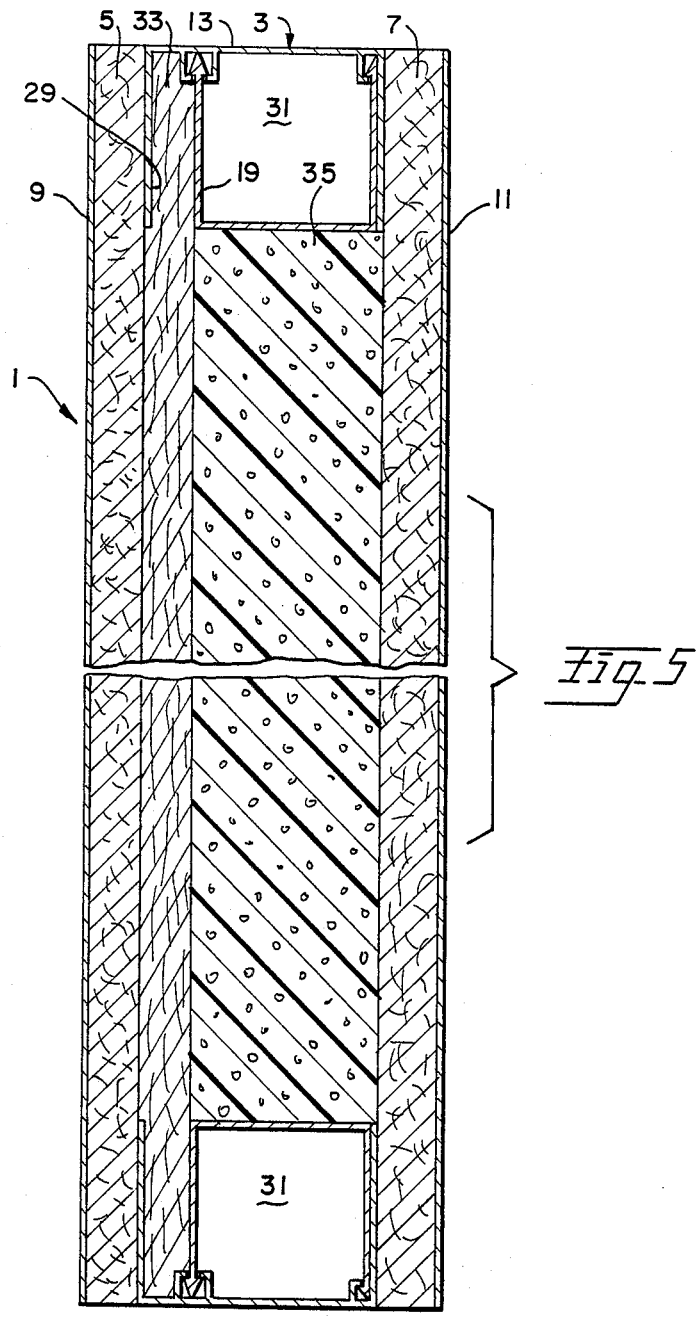
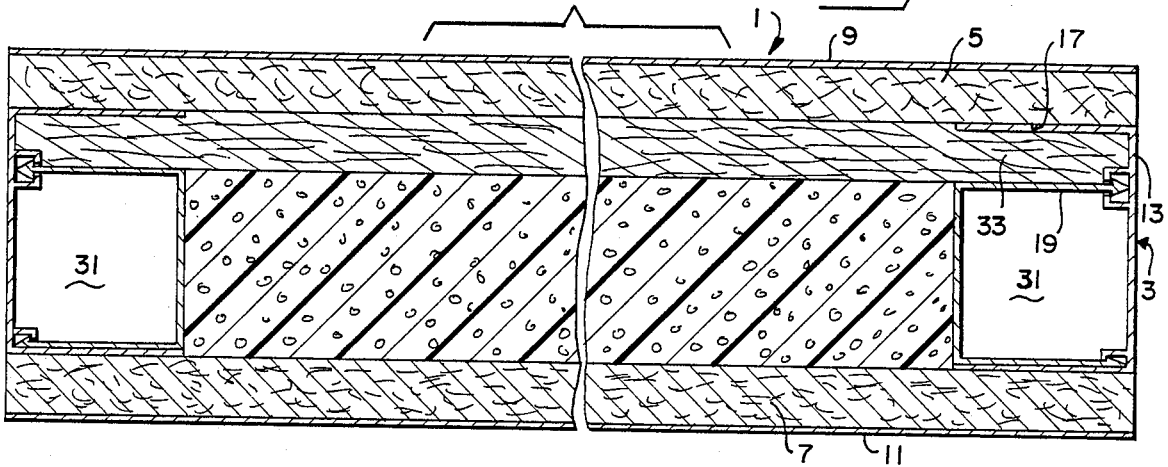

BULLET RESISTANT PANEL

BACKGROUND OF THE INVENTION

1. Field of the Invention

The present invention generally relates to the field of technology involving shielding for protecting against high impact force projectiles. More particularly, the invention relates to an improved bullet penetration resistant panel for use in constructing protective barriers or wall structures.

2. Description of the Prior Art

The concept of protective shielding for resisting or repelling the penetration of a bullet or similar high impact force projectile is well known in the prior art. Such shielding may be in the form of a garment known as a bullet-proof vest which is often worn by law enforcement personnel. The shielding may also be in the form of a rigid panel or armor plate which can be used to construct protective walls or barriers, such as utilized in banks, prisons and other security environments.

Bullet resistant shieldings are generally defined by plural layers of different materials secured or laminated together to define a panel assembly that is capable of either repelling or absorbing the high impact force imparted by the projectile. A material which has been frequently used in forming a shielding laminate is Kevlar, a synthetic aramid fiber material which, when assembled in layered fabric form or laminated with other materials, provides excellent impact resistance and durability. Kevlar fibers are characterized by high strength to weight ratio, high tensile modulus, RF transparency, thermal stability, fire resistance and corrosion resistance. These advantageous characteristics of Kevlar have rendered woven fabrics made therefrom highly advantageous in use for soft body armor, such as bullet-proof vests. Layers of Kevlar fabric have also been secured or bonded together and used in constructing rigid armor plates.

SUMMARY OF THE INVENTION

It is an object of the invention to provide an improved protective shielding for resisting high impact force projectiles.

It is another object of the invention to provide an improved protective shielding for resisting the impact force of bullets and similar projectiles wherein the shielding is of simple construction and economical to manufacture.

It is a further object of the invention to provide an improved protective panel structure capable of resisting penetration by high impact force projectiles, such as bullets, wherein the panel may be easily utilized in constructing walls or barriers defining protected areas in banks, airports, computer rooms, prisons and other security environments.

These and other objects of the invention are realized by providing a panel structure comprising plural layers of Kevlar or Kevlar-type ballistic fabric disposed against a layer of insulation foam, the fabric and foam being secured together by a frame to define an assembly that is further laminated between a pair of intermediate substrate layers formed of cellulosic material and a pair of exterior facing layers formed of metal. The frame includes an annular cavity which may be filled with additional insulation material for enhancing the insulating properties of the panel and also provide additional area for the fabric layers to stretch during impact of the panel by a projectile. The insulation material is preferably synthetic plastic foam, the intermediate substrate layers are preferably each of wood or wood derived board structure, and the exterior metal layers are preferably each of aluminum or steel provided with an appropriate durable surface finish. The frame is preferably formed of wood or extruded aluminum channel-shaped members.

The foregoing and other objects, advantages and features of the invention shall become apparent from the following detailed description of preferred embodiments thereof, when taken in conjunction with the drawings wherein like reference characters refer to corresponding parts in the several views.

BRIEF DESCRIPTION OF THE DRAWINGS

FIG. 5 is an enlarged fragmentary vertical sectional view, taken on the line 5—5 of FIG. 1; and FIG. 6 is a transverse vertical sectional view, taken on the line 6—6 of FIG. 1.

DETAILED DESCRIPTION OF THE PREFERRED EMBODIMENTS

Figure 1:
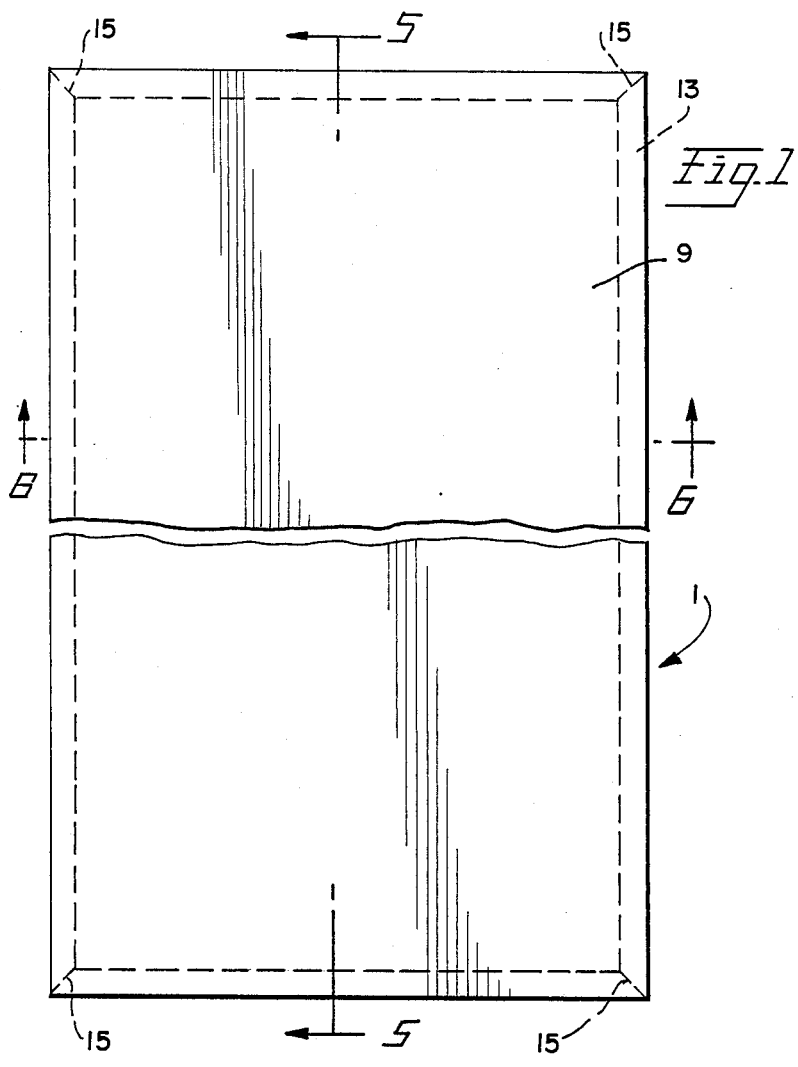
FIG. 1 is a fragmentary elevational view of an improved bullet resistant panel according to a preferred embodiment of the invention.
Figure 2:
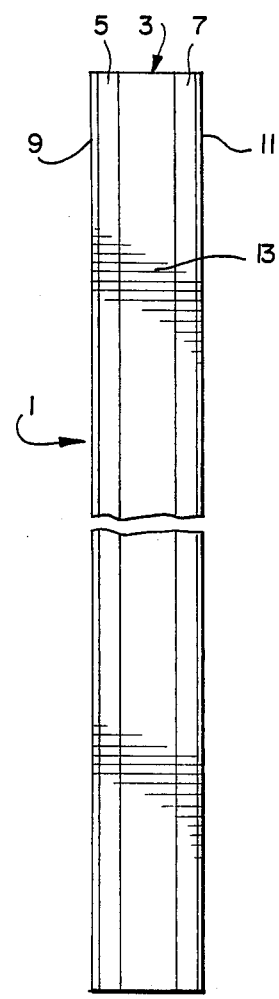
FIG. 2 is a fragmentary side elevational view of the panel shown in FIG. 1.

A bullet resistant panel 1 in accordance with a preferred embodiment of the invention shall now be described with initial reference to FIGS. 1 and 2. As shown therein, panel 1 is of a substantially rectangular configuration and defined by a laminate that is comprised of an assembly 3, disposed between a pair of intermediate substrate layers 5 and 7, which are in turn disposed between a pair of exterior facing layers 9 and 11.

Figure 3:
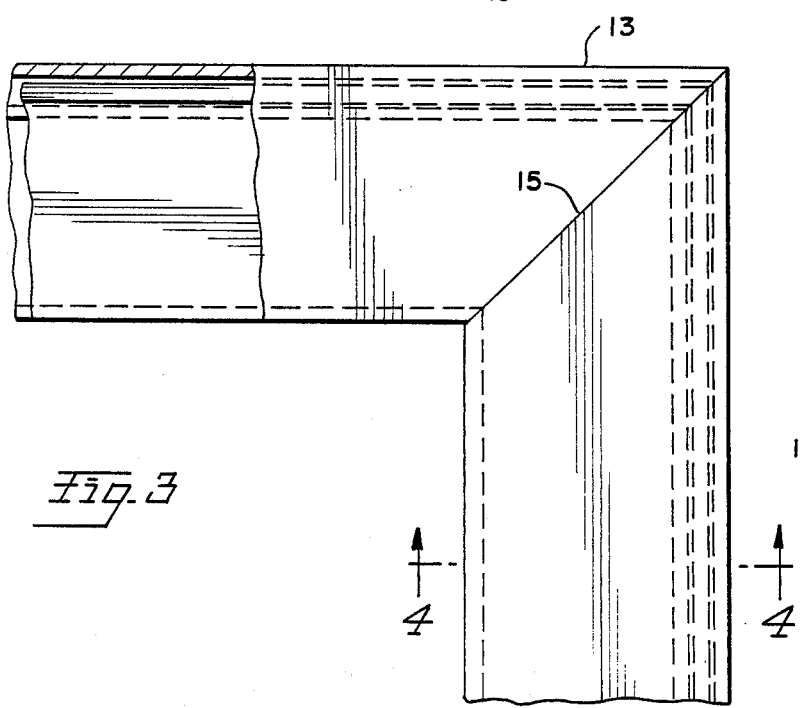
FIG. 3 is an enlarged fragmentary plan view of a corner of the frame used in forming the assembly comprising an impact resistant fabric layer and a foam insulation layer.
Figure 4:
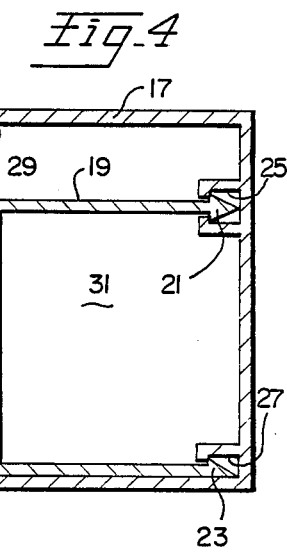
FIG. 4 is a fragmentary sectional view of the frame shown in FIG. 3, taken on the line 4—4 of FIG. 3.

The specific details of assembly 3 shall be later described. However, as seen in FIGS. 1 and 2, assembly 3 is defined in part by a rectangular-shaped frame 13 which is inwardly recessed within the outer periphery of panel 1 so that the external surfaces of frame 13 is coplanar with the edge surfaces of substrate layers 5, 7 and facing layers 9, 11. With particular reference to FIGS. 3 and 4, frame 13 is preferably formed of extruded aluminum in four channel sections which are joined at four 45° butt joints, as generally shown at 15, with each channel section including an outer channel member 17 and an inner channel member 19, both of which have a substantially U-shaped cross-sectional configuration. Channel member 19 is received within and securely locked to channel member 17 by a pair of arrow-shaped longitudinal ribs 21 and 23 carried by member 19 which are snapped into a pair of correspondingly-shaped longitudinal locking recesses 25 and 27 carried by member 17. This arrangement permits frame 13 to define an annular inwardly directed slot 29 and an annular cavity 31 for purposes which shall hereinafter be described.

With reference now to FIGS. 5 and 6, assembly 3 is further shown as including an impact resistant fabric layer 33 and an insulation layer 35. Fabric layer 33 may comprise one or more layers of fabric which are secured together in an appropriate manner, with the peripheral edges of layer 33 being crimped, clipped or otherwise securely fitted within slot 29 of frame 13. Insulation layer 35 is substantially of the same width as inner channel member 19 and completely fills the internal space within panel 1 defined by the inner perimeter of channel member 19. Cavity 31 may optionally be filled with additional insulation material, preferably the same type of material making up insulation layer 35.

As apparent from FIGS. 5 and 6, exterior facing layer 9 defines the external facing of panel 1 against which the high impact force projectiles, such as bullets, are directed. Facing layers 9 and 11 are each formed from a thin sheet of metal, preferably aluminum or steel. The exposed surfaces of layers 9 and 11 may be painted, anodized, porcelain enameled or otherwise finished in any manner deemed appropriate for the intended environment within which panel 1 is to be installed.

Intermediate substrate layers 5 and 7 are each formed from cellulosic material, preferably material derived from wood or wood products. Examples of materials deemed suitable for layers 5 and 7 include wood, plywood, fiberboard, particle board, and other similar substrates.

While it is preferred that frame 13 be formed from extruded aluminum as disclosed herein, it is also possible that frame 13 can be advantageously formed from other materials, including metal, plastic or wood. The manner in which inner channel member 19 is secured to outer channel member 17 may also be varied in accordance with the specific type of material being utilized in forming frame 13.

Insulation layer 35 and any additional insulation which is desired to be disposed within cavity 31 should be formed from a material having high thermal insulating capability. Specifically, polymeric foams, such as urethane foam, isocyanurate foam and styrofoam are preferred materials for this purpose. In addition to providing thermal insulative capability to panel 1, insulation layer 35 and insulation material disposed within cavity 31 serve to provide a soft backing for cushioning the stretching of fabric layer 33 during impact of panel 1 by a projectile.

Fabric layer 33 is preferably formed from any fabric known in the art as capable of resisting the high impact force of projectiles, such as bullets or the like. Preferred fabrics for this purpose include those made from ballistic Nylon 29/49. Kevlar is a trademark of the E.I. DuPont de Nemours and Company of Delaware and identifies fibers produced and sold by this company. Fabrics woven from Kevlar fibers have been found to be particularly effective for use in making laminated fabric armor. These fabrics are generally loosely woven and stretchable in many directions. The Kevlar fiber yarns utilized in weaving the fabrics are made up of a multiplicity of extremely fine filamentary fibers of tempered long chain polyester resin which are also produced and sold by DuPont under the trademark Nylon or Aramid. The yarn of this material is extremely strong and will absorb considerable kinetic energy of projectiles, such as bullets or the like, which impact upon fabric made therefrom. Moreover, the yarn is sufficiently strong and tough that it tends to cause the metal of bullets and similar projectiles to yield and deform against and about same when engaged by such projectiles under high impact force.

Fabric layer 33 is assembled from one or more layers of fabric formed from Kevlar or Kevlar type fibers. The individual layers of fabric may be secured together in any manner well known in the art. For example, the outer edges of the layers may first be sewn together by stitching around its outer perimeter, followed by cross-stitching periodically spaced along the sheet of the plural layers. Thereafter, longitudinal stitching may be sewn perpendicular to the cross-stitching. The stitch spacing and tightness of the stitch should be fairly accurately controlled in order to obtain optimum tightness and spacing, factors which enhance the resistance of the assembled layers to projectiles.

The number of fabric layers and thickness of fabric layer 33 may be varied depending upon the level of protection desired. For example, the specification and tests for body armor are set forth in the National Institute of Judicial Standards, NILECJ-STD-D0101-0.01, dated December 1978, and in the Selection and Application Guide to Police Body Armor, National Institute of Justice, dated September 1981. The levels of protection are designated Threat Level Type I, Type IIA, II and III. An example of a panel 1 constructed in accordance with the practice of the invention and suitable for a protection level of Type IIA shall have the following specifications: Fabric layer 33 comprises sufficient layers of Kevlar fabric so as to form an overall thickness of one-quarter inch, each exterior facing layer 9 and 11 is of 28 gauge aluminum or porcelain enameled steel, each intermediate substrate 5 and 7 is of one-eighth inch hardboard, and insulation layer 35 is of one and one-half inch urethane foam having an insulation value of R-11. Frame 13 is formed of 0.063 inch extruded aluminum.

It is of course understood that the thickness of the different layers defining the overall laminate making up panel 1 may each be varied in order to provide the protection level desired for the intended application of use for panel 1. Fabric layer 33 provides the critical impact force absorbing component of panel 1, so that the establishment of the overall thickness of layer 33 is of primary importance in establishing the overall protection level of panel 1.

The assembly of panel 1 is preferably accomplished by securing fabric layer 33 within frame 13 in the manner previously described. Insulation 35 is also secured within frame 13, preferably through adhesive bonding to both frame 13 and fabric layer 33 to form assembly 3. Intermediate substrate layers 5, 7 and exterior facing layers 9, 11 are thereafter adhesively bonded to assembly 3 and to each other. This may be accomplished by applying neoprene adhesive to all mating surfaces and permitting the solvent contained within the adhesive to evaporate. Thereafter, the layers are assembled together under pressure from a rotary press to create the final laminated panel product. Other suitable adhesives well known in the art may also be advantageously utilized in the practice of this invention.

The overall size and configuration of panel 1 may be varied depending upon its application of use. Panel 1 may be of conventional size for installation in commercially available framing or glazing systems, or retrofitted to existing building structures. It is also possible in some applications to form panel 1 without frame 13, in which case insulation layer 35 should then be coextensive in size and shape with the remaining components of panel 1.

It is to be understood that the embodiments of the invention herein shown and described are to be taken as preferred examples of the same, and that various changes in shape, size, composition and arrangement of parts may be resorted to without departing from the spirit of the invention or scope of the subjoined claims.

I claim:

1. A protective panel for resisting the high impact force of a bullet or similar projectile, which panel comprises an assembly of substantially rectangular configuration including a layer of impact resistant fabric and a layer of thermal insulation material, a frame forming the outer periphery of the assembly and including an inwardly directed annular slot within which the outer edges of the fabric layer are secured and an annular cavity for receiving insulation material, the assembly being disposed between a pair of intermediate substrate layers and a pair of exterior facing layers, and wherein at least one substrate layer is formed of cellulosic material and at least one facing layer is formed of metal.

2. The panel of claim 1 wherein the frame is formed of extruded aluminum and includes plural inner and outer channel members carrying cooperative locking means for permitting the channel members to be locked to each other.

3. A panel of claim 1 wherein the locking means include at least one longitudinal rib carried by the inner channel member and at least one correspondingly shaped longitudinal recess carried by the outer channel member.

* * * * *